Jan. 11, 1955  K. M. WHITE  2,699,247
TURNTABLE CONVEYER
Filed Aug. 7, 1953  3 Sheets-Sheet 1
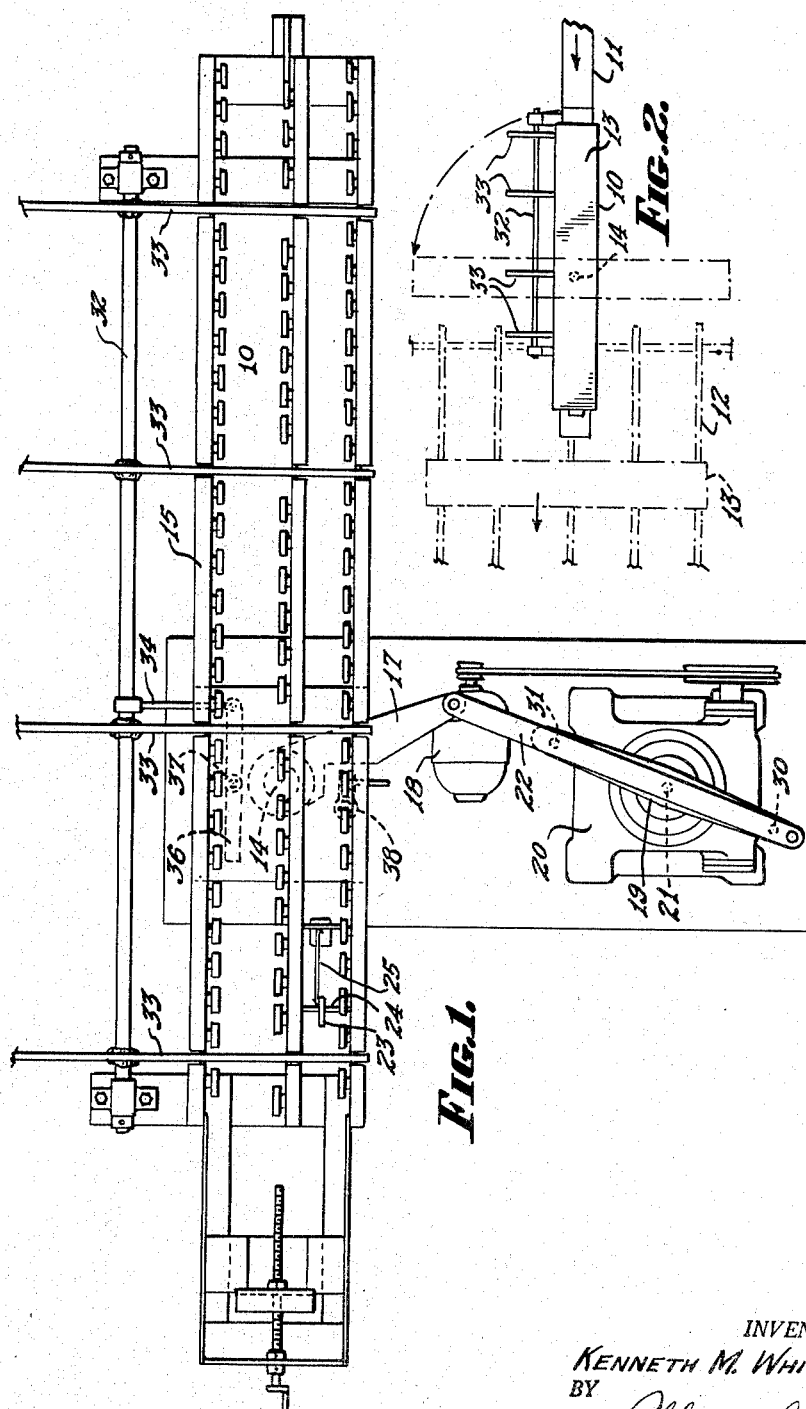
INVENTOR.
KENNETH M. WHITE,
BY
ATTORNEYS.

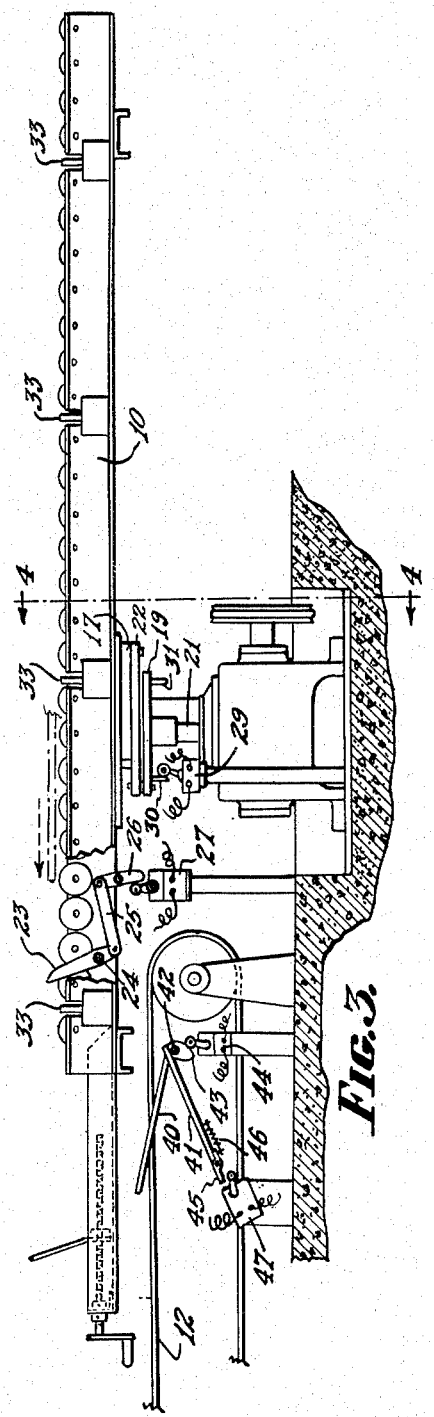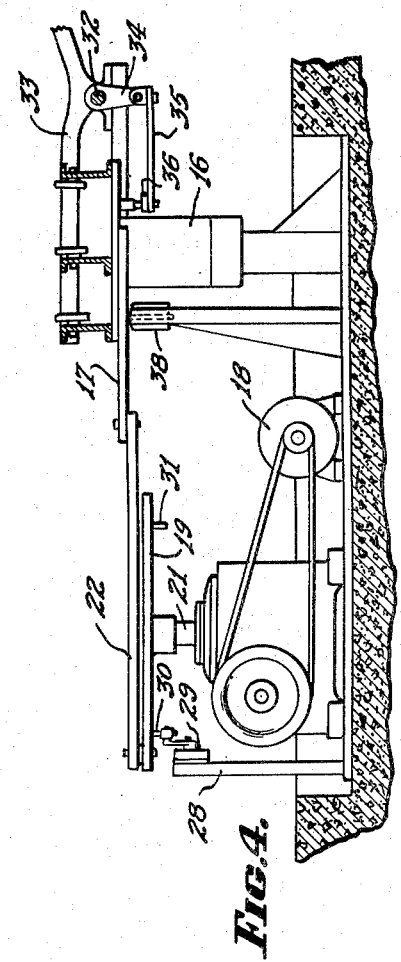

Jan. 11, 1955     K. M. WHITE     2,699,247
TURNTABLE CONVEYER

Filed Aug. 7, 1953     3 Sheets-Sheet 3

INVENTOR.
KENNETH M. WHITE,
BY
ATTORNEYS.

United States Patent Office 2,699,247
Patented Jan. 11, 1955

2,699,247

TURNTABLE CONVEYER

Kenneth M. White, Zanesville, Ohio, assignor to Armco Steel Corporation, Middletown, Ohio, a corporation of Ohio Application August 7, 1953, Serial No. 373,023

6 Claims. (Cl. 198—33)

This invention relates to a turntable conveyor and while it is susceptible to numerous applications, it is particularly suitable for use in handling of hot packs of sheets as rolled on 3-high mills.

After the pack has passed through the mill on its final pass, it moves on a run-out table and must then be transferred to a cooling conveyor. It is often a matter of convenience to turn the packs so that they move over the cooling conveyor broadside rather than lengthwise. However, the packs pass through the mill lengthwise and if it is desired to move them broadside for cooling, means must be provided to turn the packs through 90° and transfer them from one conveyor to another.

With the foregoing considerations in mind, it is an object of the present invention to provide an organization including a conveyor for moving an object, which may be a pack, longitudinally, means for rotating the table through an arc of 90° and means for transferring the object from the turntable conveyor to a further conveyor (which may be a cooling conveyor) on which the object is moved broadside.

It is a further object of the invention to provide a mechanism for causing the organization to operate automatically with the object itself initiating the various objects of the apparatus.

These and various other objects of the invention, which will be set forth in greater detail hereinafter or which will be apparent to one skilled in the art, upon reading these specifications, I accomplish by that certain construction and arrangement of parts of which I shall now describe an exemplary embodiment.

Reference is made to the drawings forming a part hereof and in which:

Figure 1 is a general plan view of the apparatus.

Figure 2 is a diagrammatic view similar to Figure 1 showing the relationship of the turntable conveyor to the longitudinal conveyor and the broadside conveyor.

Figure 3 is an elevational view as seen from the bottom of Figure 1.

Figure 4 is a cross sectional view taken on the line 4—4 of Figure 3.

Figure 5:
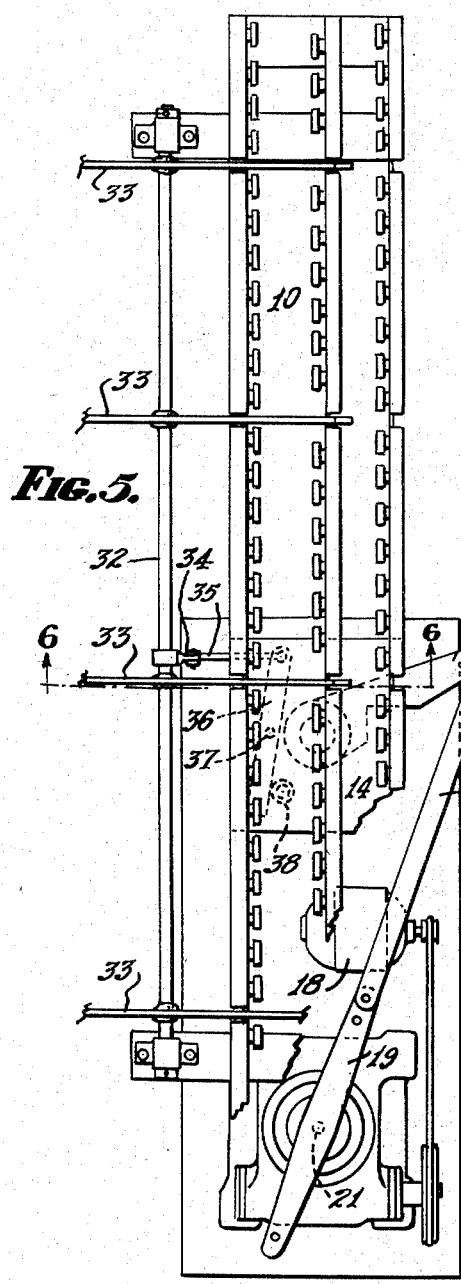
Figure 5 is a view similar to Figure 1 showing the table rotated through 90°.

Briefly, in the practice of my invention and particularly with reference to Figure 2, I provide a turntable conveyor indicated generally at 10 disposed in alignment with a longitudinal conveyor 11 and centrally aligned with a run-off or broadside conveyor 12. An object 13, which may be a pack of hot-rolled sheets issuing from its last pass in a mill, passes longitudinally over the conveyor 11 onto the turntable 10. Automatic means initiated by the pack are provided to cause the table 10 to rotate about an axis 14 to the position shown in broken lines. Other automatic means are provided to operate a transfer mechanism to transfer the pack 13 onto the conveyor 12 whereupon other automatic means initiate movement of the conveyor 12 and cause the turntable conveyor 10 to return to its solid line position.

The turntable conveyor, generally speaking, comprises a framework 15 mounted for rotation about a vertical pivot on the axis 14. This pivot may comprise a column 16 (Figure 4). The various details of construction of the turntable conveyor do not form a part of the invention and, therefore, will not be discussed in detail. As is well understood in the art, it may be provided with usual stops and guides if desired.

Secured to the turntable conveyor or to its column 16 is a lever arm 17 by means of which the table may be turned. A motor 18 drives a crank 19 through a speed reducer 20. The crank 19 comprises two arms extending equal distances on either side of the axis 21 of the speed reducer output shaft. To one end of the crank 19 is secured a link 22, which link at its other end is secured to the lever arm 17. It will be observed that in the position of Figure 1 the length of the lever arm 17 plus the length of the link 22 are greater than the distance between the axes 14 and 21 plus the throw of the crank 19. Similarly, in the position of Figure 5, the length of the link 22 plus the throw of the crank 19 is less than the distance between the pivot axes 14 and 21 plus the length of the lever arm 17. Therefore, continued rotation of the crank 19 in a continuous direction produces an oscillation of the lever arm 17. The length of the various arms and their positions are selected in such a manner that at one dead-center position of the crank 19 the conveyor 10 is in one of its two positions and at the other dead-center position the conveyor is in its other position 90° removed from its first position.

As best seen in Figure 3, a lever 23 is pivoted at 24 on the conveyor 10 in a position that it can be actuated by an object passing over the conveyor 10. Movement of the lever 23 through a linkage 25, 26 actuates a switch 27 which is operatively connected to the motor 18 to start the turntable.

Secured to a frame element 28 is a switch 29, positioned to be actuated by elements 30 and 31 depending from the crank 19 at diametrically opposed points. The switch 29 is of the type which makes one contact in one position and another when it is thrown to the other position (see Figure 7). Thus, when the turntable has rotated 90° from its position by actuation of the switch 27, the turntable will be stopped when the next of the elements 30 or 31 actuates the switch 29 to throw it to its other position.

Figure 6:
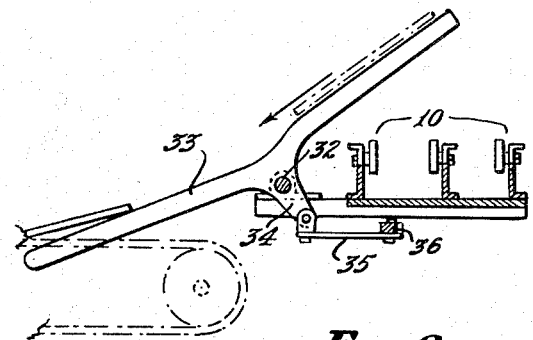
Figure 6 is a fragmentary cross sectional view taken one the line 6—6 of Figure 5.

For the purpose of transferring the pack or other object from the turntable conveyor to the broadside conveyor, there is mounted parallel to the conveyor 10 a rock shaft 32. This rock shaft carries a number of transfer arms 33, the arms of which may be at a slight angle to each other, as best seen in Figures 4 and 6. A rocker arm 34 is secured to the rock shaft 32 and the rocker arm 34 is secured by a link 35 to an actuating bearing 36 which is pivoted at 37. Mounted beneath the conveyor 10 is affixed abutment 38 (Figures 4 and 5) and it will be clear that as the conveyor 10 approaches its position of Figure 5, an end of the actuator bearing 36 abuts the abutment 38 causing the bearing 36 to pivot about its axis 37, thus pulling on the link 35 and through it on the rocker arm 34, causing the rock shaft 32 to rock and move the members 33 to the position of Figure 6, lifting the pack off the conveyor 10 and causing it to slide broadside onto the cooling conveyor 12. It will be understood that as soon as the turntable starts to return to its initial position, the transfer mechanism returns to its original position by gravity.

Associated with the cooling conveyor or broadside conveyor is an arrangement best seen in Figure 3. This comprises a pair of levers 40, 41 arranged for movement together about an axis 42. A cam element 43 is arranged upon movement in a counterclockwise direction of the arm 40 to actuate a switch 44. The switch 44 is operatively connected to an electric motor (not shown) for driving the conveyor 12 and it will therefore be clear that as the pack is transferred into the conveyor 12 depressing the lever 40, the conveyor 12 starts to operate. The lever 40 will not return to the position of Figure 3 until the trailing edge of the pack clears it.

The arm 41 has a finger 45 mounted thereon so that it may yield rockingly in a clockwise direction against the tension of the spring 46. The finger 45 actuates a switch 47 to initiate action of the motor 18. As the lever 40 is depressed by a pack, the lever 41 also rocks in a counterclockwise direction and the finger 45 yields to pass the switch actuating lever. When the trailing edge of the pack clears the lever 40 so that it returns to the position of Figure 3, the finger 45 actuates the switch 47. The switch 47 again establishes a circuit to the motor 18 to start the turntable on its return oscillation. The oscillation of the turntable will of course stop when the next one of the elements 30 or 31 throws the switch 29.

Figure 7:
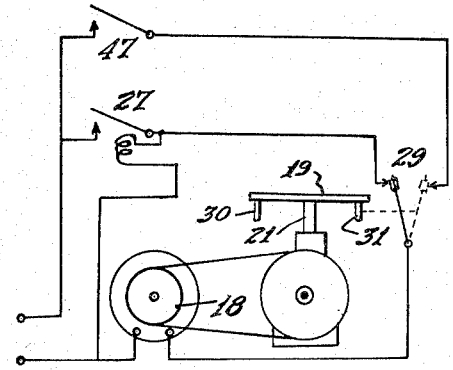
Figure 7 is a wiring diagram.

The wiring diagram of Figure 7 shows the sheets with the machine at rest before a pack contacts the lever 23. It will be observed that when the switch 27 is closed a circuit is established through the switch 29 to the motor 18 and that this circuit is broken when the switch 29 is thrown to its other position. However, in the other position the switch 29 is ready to complete a circuit to the motor when the switch 47 is closed. Since as soon as the switch 27 is closed and the turntable begins to move, the lever 26 moves out of contact with the actuating lever of the switch 27 and a holding circuit is provided for the switch, as seen in Figure 7.

It will be clear that many modifications may be made without departing from the spirit of my invention. The disclosure of specific details herein is intended to be exemplary only and I do not intend to limit myself except as set forth in the claims which follow.

Having now fully described my invention, what I claim as new and desire to secure by Letters Patent is:

1. A turntable conveyor adapted to receive an object delivered thereonto longitudinally, and to turn through an arc of substantially 90° and deliver said object broadside in the same direction, comprising a conveyor element mounted on a vertical pivot axis, a lever arm fixed to said element, a motor driven crank disposed on a vertical axis adjacent said element, said crank extending diametrically across its own axis, a link connecting an end of said crank with said lever, a switch actuating member on each end of said crank, and a switch disposed to be actuated by said actuating members in turn, said switch being operatively connected to said motor to stop the same after 180° rotation of said crank, the relative positions of said crank and lever being such that 180° rotation of said crank produces 90° arcuate movement of said lever, whereby said crank rotates in a single direction in 180° stops, while said turntable oscillates through 90° of arc.

2. A turntable conveyor adapted to receive an object delivered thereonto longitudinally, and to tunrn through an arc of substantially 90° and deliver said object broadside in the same direction, comprising a conveyor element mounted on a vertical pivot axis, a lever arm fixed to said element, a motor driven crank disposed on a vertical axis adjacent said element, said crank extending diametrically across its own axis, a link connecting one end of said crank with said lever, a switch actuating member on each end of said crank, and a switch disposed to be actuated by said actuating members in turn, said switch being operatively connected to said motor to stop the same after 180° rotation of said crank, the length of said lever arm plus the length of said link being greater than the distance between said pivot axis and said crank axis plus one-half the throw of said crank, and the length of said link minus the length of said lever arm being greater than the distance between said pivot axis and said crank axis minus one-half the throw of said crank, whereby said crank rotates in a single direction in 180° stops, while said turntable oscillates through 90° of arc.

3. In a turntable conveyor having means to oscillate it about a vertical axis from a longitudinal receiving position to a broadside discharging position, a longitudinal rock shaft mounted on and parallel to said conveyor, a plurality of V-shaped arms fixed to said rock shaft with one arm of each of said V's lying across said conveyor below the pass line and the other arm of each of said V's extending outward and upward, a rocker arm secured to said rock shaft for rocking the same, a linkage for actuating said rocker arm, and a fixed abutment engaged by said linkage at said broadside discharging position, rocking said rock shaft to tilt said V-shaped arms to raise an object on said conveyor and cause it to slide off on said outwardly extending arms.

4. In a turntable conveyor having means to oscillate it about a vertical axis from a longitudinal receiving position to a broadside discharging position, a longitudinal rock shaft mounted on and parallel to said conveyor, a plurality of V-shaped arms fixed to said rock shaft with one arm of each of said V's lying across said conveyor below the pass line and the other arm of each of said V's extending outward and upward, a rocker arm secured to said rock shaft for rocking the same, and means operative as said turntable conveyor reaches its broadside discharging position for actuating said rock shaft to tilt said V-shaped arms to raise an object on said conveyor and cause it to slide off on said outwardly extending arms.

5. In combination with a conveyor for moving an object endwise in a given direction, and a conveyor for moving such object broadside in the same direction, a turntable between said conveyors arranged for oscillating movement about a vertical axis through an arc of substantially 90°, motive means for said turntable, switch means at the advance end of said turntable positioned to be actuated by the leading end of an object to energize said motive means to turn said turntable, a limit switch for deenergizing said motive means when said table has turned through an arc of substantially 90°, transfer means associated with said turntable to transfer an object from said turntable onto said broadside conveyor, a linkage for actuating said transfer means, and cam means for actuating said linkage substantially at the completion of said 90° turn, and switch means associated with said broadside conveyor and actuated by the trailing end of an object on said broadside conveyor to energize said motive means to return said turntable to its starting position.

6. In combination, a conveyor for moving an object endwise in a given direction, a conveyor for moving such object broadside in the same direction, a turntable between said conveyors arranged for oscillating movement about a vertical axis through an arc of substantially 90°, a lever arm secured to said turntable, a link and a crank for oscillating said turntable, motive means to rotate said crank in a single direction, switch means arranged for actuation by said crank at the end of each 180° of rotation, switch means on said turntable arranged to be actuated by the leading edge of an object when said object is completely supported on said turntable, for energizing said motive means, said crank-actuated switch means serving to deenergize said motive means after said crank has rotated 180°, driving means for said broadside conveyor, switch means for said driving means, an actuator for said last mentioned switch means to energize said driving means when an object starts onto said broadside conveyor and contacts said actuator, and other switch means for energizing said motive means, said other switch means being operated by said actuator when said object breaks contact with said actuator, to produce return movement of said turntable to starting position.

No references cited.